United States Patent
Couillard et al.

(10) Patent No.: US 10,189,228 B2
(45) Date of Patent: Jan. 29, 2019

(54) ASYMMETRIC PROCESSING METHOD FOR REDUCING BOW IN LAMINATE STRUCTURES

(71) Applicant: Corning Incorporated, Corning, NY (US)

(72) Inventors: James Gregory Couillard, Ithaca, NY (US); Michael Aaron McDonald, Painted Post, NY (US); Paul George Rickerl, Endicott, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/386,534

(22) Filed: Dec. 21, 2016

(65) Prior Publication Data
US 2017/0182739 A1    Jun. 29, 2017

Related U.S. Application Data

(60) Provisional application No. 62/272,266, filed on Dec. 29, 2015.

(51) Int. Cl.
| | |
|---|---|
| B32B 17/10 | (2006.01) |
| B32B 7/02 | (2006.01) |
| C03C 21/00 | (2006.01) |
| B32B 3/28 | (2006.01) |
| B32B 7/12 | (2006.01) |

(Continued)

(52) U.S. Cl.
CPC ............... *B32B 7/02* (2013.01); *B32B 3/28* (2013.01); *B32B 7/12* (2013.01); *B32B 17/101* (2013.01); *B32B 17/10981* (2013.01); *B32B 37/0015* (2013.01); *B32B 37/06* (2013.01); *B32B 37/16* (2013.01); *B32B 38/0036* (2013.01); *C03C 21/001* (2013.01); *B32B 37/144* (2013.01); *B32B 2038/0048* (2013.01);
(Continued)

(58) Field of Classification Search
None
See application file for complete search history.

(56) References Cited

U.S. PATENT DOCUMENTS

| | | |
|---|---|---|
| 3,522,029 A | 7/1970 | Carson et al. |
| 3,923,488 A | 12/1975 | Pytel et al. |

(Continued)

FOREIGN PATENT DOCUMENTS

| | | |
|---|---|---|
| WO | 2014035942 A1 | 3/2014 |
| WO | 2015031594 A2 | 3/2015 |

OTHER PUBLICATIONS

International Search Report and Written Opinion PCT/US2016/068037 dated Apr. 28, 2017.

*Primary Examiner* — Z. Jim Yang
(74) *Attorney, Agent, or Firm* — Jason A. Barron (57) ABSTRACT

Disclosed herein are methods for making asymmetric laminate structures and methods for reducing bow in asymmetric laminate structures, the methods comprising differentially heating the laminate structures during lamination or differentially cooling the laminate structures after lamination. Also disclosed herein are methods for reducing bow in asymmetric laminate structures, the methods comprising subjecting at least one substrate in the laminate structure to asymmetric tempering or annealing prior to lamination. Further disclosed herein are laminate structures made according to such methods.

13 Claims, 3 Drawing Sheets

(51) Int. Cl.
  *B32B 37/06*   (2006.01)
  *B32B 37/16*   (2006.01)
  *B32B 37/00*   (2006.01)
  *B32B 38/00*   (2006.01)
  *B32B 37/14*   (2006.01)

(52) U.S. Cl.
  CPC . *B32B 2038/0088* (2013.01); *B32B 2307/412* (2013.01); *B32B 2315/08* (2013.01); *Y10T 428/315* (2015.01)

(56) References Cited

U.S. PATENT DOCUMENTS

| | | | | |
|---|---|---|---|---|
| 4,857,407 A * | 8/1989 | Coleman | ........... | B32B 17/10018 428/412 |
| 2008/0286548 A1 * | 11/2008 | Ellison | ........... | C03B 17/06 428/220 |
| 2009/0321005 A1 * | 12/2009 | Higuchi | ........... | B32B 7/06 156/249 |
| 2011/0261429 A1 * | 10/2011 | Sbar | ........... | B32B 17/10045 359/265 |
| 2011/0281093 A1 * | 11/2011 | Gulati | ........... | B32B 37/08 428/213 |
| 2012/0017975 A1 * | 1/2012 | Giron | ........... | B32B 17/10036 136/252 |
| 2012/0171454 A1 * | 7/2012 | Kondo | ........... | B32B 17/10 428/220 |
| 2012/0192928 A1 * | 8/2012 | Krol | ........... | B32B 17/10045 136/251 |
| 2012/0236526 A1 * | 9/2012 | Weber | ........... | C03C 21/002 361/807 |
| 2013/0279000 A1 * | 10/2013 | Maeda | ........... | B32B 17/10018 359/360 |
| 2013/0295357 A1 * | 11/2013 | Cleary | ........... | B32B 17/10036 428/215 |
| 2014/0127857 A1 * | 5/2014 | Chen | ........... | B32B 7/02 438/107 |
| 2014/0178690 A1 * | 6/2014 | Kreski | ........... | C03C 21/002 428/410 |
| 2014/0212649 A1 * | 7/2014 | Katayama | ........... | C03C 3/085 428/220 |
| 2015/0111016 A1 * | 4/2015 | Fisher | ........... | B32B 17/10036 428/215 |
| 2015/0166407 A1 * | 6/2015 | Varshneya | ........... | C03C 21/003 428/174 |
| 2015/0174861 A1 * | 6/2015 | Hasegawa | ........... | B32B 17/10018 428/337 |
| 2015/0274585 A1 * | 10/2015 | Rogers | ........... | C03C 21/002 361/679.26 |
| 2015/0336357 A1 | 11/2015 | Kang et al. | | |
| 2016/0121583 A1 * | 5/2016 | Edwards | ........... | H01L 51/524 428/215 |
| 2016/0136929 A1 * | 5/2016 | Meiss | ........... | B32B 38/10 428/213 |
| 2016/0193812 A1 | 7/2016 | Couillard | | |
| 2016/0326050 A1 * | 11/2016 | Lee | ........... | C03C 21/002 |
| 2017/0021597 A1 * | 1/2017 | Michetti | ........... | B32B 17/10036 |
| 2017/0066223 A1 * | 3/2017 | Notsu | ........... | B32B 17/06 |
| 2017/0113520 A1 * | 4/2017 | Sienerth | ........... | B32B 17/10036 |
| 2017/0113963 A1 * | 4/2017 | Kim | ........... | C03B 25/08 |
| 2017/0203547 A1 * | 7/2017 | Bensend | ........... | B32B 13/04 |
| 2017/0226007 A1 * | 8/2017 | Garner | ........... | C03C 21/002 |
| 2017/0247291 A1 * | 8/2017 | Hatano | ........... | C03C 3/085 |
| 2017/0334769 A1 * | 11/2017 | Luzzato | ........... | C03C 3/076 |
| 2018/0009705 A1 * | 1/2018 | Ishibashi | ........... | B60J 1/00 |

* cited by examiner

ASYMMETRIC PROCESSING METHOD FOR REDUCING BOW IN LAMINATE STRUCTURES

This application claims the benefit of priority under 35 U.S.C. § 119 of U.S. Provisional Application Ser. No. 62/272,266 filed on Dec. 29, 2015, the content of which is relied upon and incorporated herein by reference in its entirety.

FIELD OF THE DISCLOSURE

The disclosure relates to laminate structures and methods for manufacturing laminate structures and, more particularly, to methods for reducing bow in asymmetric glass laminate structures.

BACKGROUND

Laminate structures may be used for a wide range of applications in a variety of industries. For example, laminate structures may be used in architectural applications such as siding, decorative panels, cabinet installations, wall coverings, and the like. Laminate structures may also be used for furniture items and/or household appliances. For instance, laminate structures may be incorporated as outer panels for a cabinet, furniture item, and/or household appliance. Laminate structures can further serve as functional or decorative components in automobiles, e.g., windows, sunroofs, mirrors, and exterior or interior paneling.

Automotive, transportation, aviation, and architectural windows are often made from laminate structures comprising two glass sheets of similar thickness and composition. However, for various applications it may be desirable to provide laminate structures comprising dissimilar substrates, e.g., substrates of different composition and/or thickness. For instance, metal-glass laminates, plastic-glass laminates, glass-ceramic laminates, and other similar laminates may be desirable for aesthetic or structural qualities.

In addition, glass-glass laminates comprising dissimilar glass substrates may also be desirable for various applications, for example, laminates comprising glasses having different compositions, thicknesses, and/or other properties such as coefficient of thermal expansion (CTE). By way of a non-limiting example, a thin sheet of ion-exchanged glass may be laminated on a thicker soda lime glass sheet to provide enhanced damage resistance. Electrochromic windows and mirrors can comprise a thin, alkali-free glass substrate upon which an electrically active thin film is deposited, which can be laminated to a thicker soda lime glass substrate for enhanced structural rigidity.

Laminate structures comprising dissimilar substrates are referred to herein as "asymmetric" laminates. While asymmetric laminates may present one or more advantages as compared to symmetric laminates, these laminates can also present various challenges. For example, asymmetric laminates can comprise two or more substrates with different CTEs. During the lamination process, the substrates can be heated to a lamination temperature and subsequently cooled, e.g., to room temperature. When the laminate structure cools, the CTE mismatch between the substrates can lead to out-of-plane deflection (often referred to as "bow"). Bow in laminate structures can interfere with subsequent processing steps such as film deposition, can result in unwanted optical distortion in the final product, and/or can result in a product that is unsuitable for the intended application and/or does not meet the desired target shape.

Accordingly, it would be advantageous to provide methods for making laminate structures that can reduce or eliminate bow in the structures after cooling. It would also be advantageous to provide asymmetric laminate structures with little or no out-of-plane deflection or bow. These and other aspects of the disclosure are discussed in further detail herein.

SUMMARY

The disclosure relates, in various embodiments, to methods for making laminate structures, the methods comprising positioning an interlayer between a first substrate and a second substrate to form a stack, and heating the stack to a lamination temperature to form a laminate structure, wherein the second substrate is an asymmetrically annealed or tempered glass substrate comprising a first surface and a second surface, the first surface having a first compressive stress less than a second compressive stress of the second surface; and wherein a minimum radius of curvature of the laminate structure at a temperature ranging from about −20° C. to about 90° C. is at least about 40 times greater than a maximum dimension of the laminate structure.

Also disclosed herein are laminate structures comprising a first substrate, a second substrate, and an interlayer attaching the first and second substrates, wherein the second substrate is an asymmetrically annealed or tempered glass substrate comprising a first surface and a second surface, the first surface having a compressive stress less than a compressive stress of the second surface; wherein a CTE of the first substrate is different than a CTE of the second substrate; and wherein a minimum radius of curvature of the laminate structure at a temperature ranging from about −20° C. to about 90° C. is at least about 40 times greater than a maximum dimension of the laminate structure.

In certain embodiments, the CTE of the second substrate may be greater than the CTE of the first substrate, and the first surface of the second substrate may be in contact with the interlayer. In other embodiments, the CTE of the second substrate may be less than the CTE of the first substrate, and the second surface of the second substrate may be in contact with the interlayer. In yet further embodiments, the first and second substrate may both be asymmetrically annealed or tempered glass substrates.

Further disclosed herein are methods for making laminate structures, the methods comprising positioning an interlayer between a first substrate and a second substrate to form a stack, heating the stack to a first average lamination temperature to form a laminate structure, and cooling the laminate structure to a second average temperature; wherein a CTE of the second substrate is greater than a CTE of the first substrate; and wherein heating the stack comprises differentially heating the first substrate at a first heating rate greater than a second heating rate of the second substrate, or wherein cooling the laminate structure comprises differentially cooling the first substrate at a first cooling rate slower than a second cooling rate of the second substrate.

Still further disclosed herein are laminate structures comprising a first glass substrate, a second glass substrate, and an interlayer attaching the first and second glass substrates, wherein a CTE of the second glass substrate is at least about 30% greater than a CTE of the first glass substrate, and wherein an out-of-plane deflection of the laminate structure is less than twice a thickness of the laminate structure.

Additional features and advantages will be set forth in the detailed description which follows, and in part will be readily apparent to those skilled in the art from that description or recognized by practicing the methods described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding, and are incorporated into and constitute a part of this specification. The drawings illustrate various non-limiting embodiments and together with the description serve to explain the principles and operations of the disclosure.

BRIEF DESCRIPTION OF THE DRAWINGS

Various features, aspects and advantages of the present disclosure are better understood when the following detailed description is read with reference to the accompanying drawings wherein like structures are indicated with like reference numerals when possible, in which.

DETAILED DESCRIPTION

Laminate Structures

Figure 1:
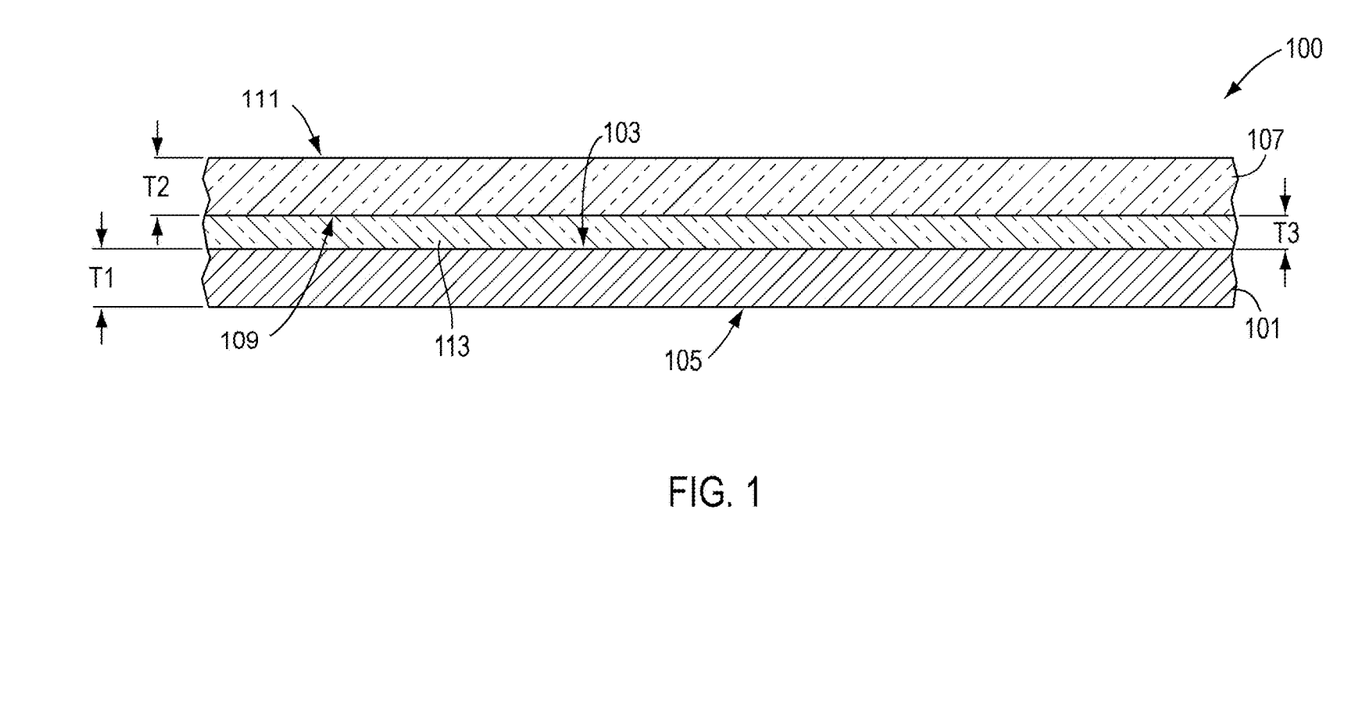
FIG. 1 is a cross sectional view illustrating an exemplary laminate structure in accordance with embodiments of the disclosure.

FIG. 1 illustrates a cross sectional view of a laminate structure 100 according to various embodiments of the disclosure. The laminate structure can include a first substrate 101, a second substrate 107 and an interlayer 113 attaching the first and second substrates. The first substrate 101 can have a first surface 103 and an opposing second surface 105 with a thickness T1 between the two surfaces. Similarly, the second substrate can have a first surface 109 and an opposing second surface 111 with a thickness T2 between the two surfaces. The interlayer 113 can also have a thickness T3.

The first and second substrates 101, 107 can comprise a wide range of materials including, but not limited to, glass, glass-ceramics, ceramics, plastics, and metals. According to non-limiting embodiments, at least one of the first and second substrates is a glass substrate. In additional embodiments, both the first and second substrates comprise glass. Suitable glass substrates may comprise, for example, soda lime, aluminosilicate, alkali-aluminosilicate, borosilicate, alkali-borosilicate, aluminoborosilicate, and alkali-aluminoborosilicate glasses, or other suitable glass materials. The glass substrate can, in some embodiments, be treated, e.g., annealed or chemically or thermally tempered, to increase the strength of the glass and/or its resistance to breakage and/or scratching. In one embodiment, the glass sheet substrate can comprise chemically strengthened glass such as Corning® Gorilla® glass from Corning Incorporated. Such chemically strengthened glass, for example, may be provided in accordance with U.S. Pat. Nos. 7,666,511, 4,483, 700, and/or 5,674,790, which are incorporated herein by reference in their entireties. Corning® Willow® glass, Corning® Lotus™ glass, Corning® EAGLE XG®, and Corning Iris™ glass from Corning Incorporated may also be suitable for use as a glass substrate in various embodiments.

According to further aspects, the first or second glass substrate can have a compressive stress (CS) greater than about 100 MPa and a depth of layer of compressive stress (DOL) greater than about 10 microns, for example, a compressive stress greater than about 500 MPa and a DOL greater than about 20 microns, or a compressive stress greater than about 700 MPa and a DOL greater than about 40 microns. For instance, a chemical strengthening process for making Corning® Gorilla® glass can impart a relatively high CS (e.g., from about 700 MPa to about 730 MPa, or even greater than about 800 MPa) at a relatively high DOL (e.g., about 40 microns, or even greater than about 100 microns).

According to further embodiments, the first or second glass substrate may be acid-etched to further strengthen the glass substrate. Acid etching of glass may enable use of even thinner substrates in the laminate structures of the disclosure without deterioration in structural integrity or impact performance. The acid etching step, in some examples, can remove a thin layer from one or more of the surfaces of the glass substrate. By removing the above-mentioned surface layer, it is believed that the acid etching can clear away a majority of surface flaws smaller than 1 micron and/or round the tips of larger flaws which could otherwise negatively impact the stress concentration factor. The improvement of the glass surface by acid etching (e.g., removal of small surface flaws and rounding the tips of larger flaws) can improve glass strength, such as impact resistance. Moreover, only a relatively small depth of glass may be removed, such that a significant CS drop in the glass sheet may not occur, as the glass can have a relatively high CS at a much larger depth, such as about 40 microns from the surface, or even greater than about 100 microns in some examples.

The first and second substrate 101, 107 can have a thickness T1, T2 extending between a first surface and an opposing second surface of less than or equal to about 10 mm, such as less than or equal to about 8 mm, less than or equal to about 6 mm, or less than or equal to about 3 mm. For example, the glass thickness can range from about 0.1 mm to about 3 mm, such as from about 0.3 to about 2 mm, from about 0.5 mm to about 1.5 mm, or from about 0.7 mm to about 1 mm, including all ranges and subranges therebetween. In one non-limiting embodiment, the glass substrate can have a thickness ranging from about 3 mm to about 10 mm, such as from about 4 mm to about 9 mm, from about 5 mm to about 8 mm, or from about 6 mm to about 7 mm, including all ranges and subranges therebetween.

In some embodiments, the first and second substrate 101, 107 can be glass substrates having a coefficient of thermal expansion (CTE) ranging, for example, from about $0.5 \times 10^{-6}/°$ C. to about $15 \times 10^{-6}/°$ C., such as from about $1 \times 10^{-6}/°$ C. to about $14 \times 10^{-6}/°$ C., from about $2 \times 10^{-6}/°$ C. to about $13 \times 10^{-6}/°$ C., from about $3 \times 10^{-6}/°$ C. to about $12 \times 10^{-6}/°$ C. from about $4 \times 10^{-6}/°$ C. to about $11 \times 10^{-6}/°$ C., from about $5 \times 10^{-6}/°$ C. to about $10 \times 10^{-6}/°$ C., from about $6 \times 10^{-6}/°$ C. to about $9 \times 10^{-6}/°$ C. or from about $7 \times 10^{-6}/°$ C. to about $8 \times 10^{-6}/°$ C., including all ranges and subranges therebetween. In certain embodiments, the glass substrate can have a CTE ranging from about $8 \times 10^{-6}/°$ C. to about $10 \times 10^{-6}/°$ C. for instance, ranging from about $8.5 \times 10^{-6}/°$ C. about $9.5 \times 10^{-6}/°$ C. In other embodiments, the glass substrate can have a CTE ranging from about $3 \times 10^{-6}/°$ C. to about $5 \times 10^{-6}/°$ C., such as from about $3.5 \times 10^{-6}/°$ C. to about $4.5 \times 10^{-6}/°$ C. According to non-limiting embodiments, the glass substrate can be Corning® Gorilla® glass having a CTE ranging from about 7.5 to about $8.5 \times 10^{-6}/°$ C., Corning® EAGLE XG® glass having a CTE ranging from about 3 to about $4 \times 10^{-6}/°$ C., Corning® Lotus™ glass having a CTE ranging from about 3 to about $4 \times 10^{-6}/°$ C., or Corning® Willow® glass having a CTE ranging from about 3 to about $4 \times 10^{-6}/°$ C. In additional embodiments, the glass substrate can be soda lime glass having a CTE ranging from about 8 to about $10 \times 10^{-6}/°$ C.

The first and second substrates 101, 107 can also be chosen from metals and metal alloys, such as steel, e.g., cold rolled steel, galvanized steel, and stainless steel, aluminum, or any other suitable metal. Commercially available stainless steels can include, for example, 200 series, 300 series, and 400 series stainless steels, such as 201#, 201#, 220#, 230#, 301#, 304#, 305#, 312#, 316#, 321#, 409#, 410#, 416#, 430#, 440#, and 446# stainless steels, to name a few. The metal substrate can, in various embodiments, have a CTE ranging from about $5 \times 10^{-6}/°$ C. to about $20 \times 10^{-6}/°$ C., such as from about $7 \times 10^{-6}/°$ C. to about $17 \times 10^{-6}/°$ C., from about $8 \times 10^{-6}/°$ C. to about $15 \times 10^{-6}/°$ C., from about $9 \times 10^{-6}/°$ C. to about $12 \times 10^{-6}/°$ C., or from about $10 \times 10^{-6}/°$ C. to about $11 \times 10^{-6}/°$ C., including all ranges and subranges therebetween.

The thickness of the metal substrate can vary depending on the particular application. Relatively thin metal sheets can be used in various applications, for example, to reduce material costs and/or weight of the laminated structure while still providing sufficient resistance to deformation. In further embodiments, relatively thick metal sheets may be used in various applications, for example, where further support is desired to maintain the mechanical integrity of the laminated structure. In some embodiments, the thicknesses may range from a 30 Gauge metal sheet up to a 10 Gauge metal sheet. In further embodiments, the thicknesses may range from a 25 Gauge metal sheet up to a 15 Gauge metal sheet. According to another non-limiting embodiment, a metal sheet having a thickness ranging from about 0.1 mm to about 5 mm may be used, for example, ranging from about 0.3 mm to about 3 mm, from about 0.5 mm to about 2 mm, or from about 1 mm to about 1.5 mm, including all ranges and subranges therebetween, although other thicknesses may be provided depending on the particular application.

A plastic substrate can also be included as a suitable laminate material, for example, molded and extruded plastics. Plastic substrates may, in certain embodiments, have a thickness ranging from about 0.1 mm to about 12 mm, such as from about 0.3 mm to about 10 mm, from about 0.5 mm to about 8 mm, from about 1 mm to about 5 mm, from about 1.5 mm to about 4 mm, or from about 2 mm to about 3 mm, including all ranges and subranges therebetween, although other thicknesses may be provided depending on the particular application. The plastic substrate can, in various embodiments, have a CTE ranging from about $5 \times 10^{-6}/°$ C. to about $130 \times 10^{-6}/°$ C., such as from about $10 \times 10^{-6}/°$ C. to about $120 \times 10^{-6}/°$ C., from about $15 \times 10^{-6}/°$ C. to about $110 \times 10^{-6}/°$ C., from about $20 \times 10^{-6}/°$ C. to about $100 \times 10^{-6}/°$ C., from about $25 \times 10^{-6}/°$ C. to about $90 \times 10^{-6}/°$ C., from about $30 \times 10^{-6}/°$ C. to about $80 \times 10^{-6}/°$ C., from about $35 \times 10^{-6}/°$ C. to about $70 \times 10^{-6}/°$ C., from about $40 \times 10^{-6}/°$ C. to about $60 \times 10^{-6}/°$ C., or from about $45 \times 10^{-6}/°$ C. to about $50 \times 10^{-6}/°$ C., including all ranges and subranges therebetween.

The first and second substrates 101, 107 can also be chosen from glass-ceramic and ceramic substrates. Suitable glass-ceramic substrates can include, for instance, lithium disilicate, nepheline, beta-spodumene, and beta-quartz glass-ceramics, to name a few. Non-limiting examples of commercially available glass-ceramics include Macor® and Pyroceram® from Corning Incorporated. The ceramic or glass-ceramic substrate can have a thickness ranging from about 0.5 mm to about 5 mm, such as from about 1 mm to about 4 mm, from about 1.5 mm to about 3 mm, or from about 2 mm to about 2.5 mm, including all ranges and subranges therebetween. The CTE of the ceramic or glass-ceramic substrate can range, for instance, from about $3 \times 10^{-6}/°$ C. to about $20 \times 10^{-6}/°$ C., such as from about $5 \times 10^{-6}/°$ C. to about $18 \times 10^{-6}/°$ C. from about $8 \times 10^{-6}/°$ C. to about $15 \times 10^{-6}/°$ C., or from about $10 \times 10^{-6}/°$ C. to about $12 \times 10^{-6}/°$ C., including all ranges and subranges therebetween.

It is to be understood that all CTE values disclosed herein are expressed as CTE measured over a temperature ranging from about 0° C. to about 300° C. The CTEs of the first and second substrates, as provided herein, can thus independently range, by way of non-limiting example, from about $0.5 \times 10^{-6}/°$ C. to about $130 \times 10^{-6}/°$ C., such as from about $1 \times 10^{-6}/°$ C. to about $100 \times^{-6}/°$ C., from about $3 \times 10^{-6}/°$ C. to about $80 \times 10^{-6}/°$ C., from about $5 \times 10^{-6}/°$ C. to about $60 \times 10^{-6}/°$ C., from about $10 \times 10^{-6}/°$ C. to about $50 \times 10^{-6}/°$ C., or from about $20 \times 10^{-6}/°$ C. to about $30 \times 10^{-6}/°$ C., including all ranges and subranges therebetween. According to various embodiments, the CTEs of the first and second substrates may be mismatched, e.g., may have values differing by at least about 0.1%, such as at least about 1%, at least about 5%, at least about 10%, at least about 15%, at least about 20%, at least about 25%, at least about 30%, at least about 40%, at least about 50%, and higher. For larger parts, e.g., greater than about $1000~\text{mm} \times 1000$ mm, a lower degree of CTE mismatch can cause a noticeable bow, for example, as low as 0.1% difference in CTE, such as at least about 0.1%, 1%, 2%, 3%, 4%, or 5%. Similarly, CTE mismatch may cause bowing in smaller parts, e.g., when CTE mismatch is greater than about 10%. By way of a non-limiting example, the CTE of the second substrate can be as much as 10 times that of the first substrate, such as about 9, 8, 7, 6, 5, 4, 3, or 2 times that of the CTE of the first substrate, or vice versa. In other non-limiting embodiments, the difference between the first and second CTEs (e.g., $CTE_2-CTE_1$ or $CTE_1-CTE_2$) can range, for instance, from about $1 \times 10^{-6}/°$ C. to about $130 \times 10^{-6}/°$ C., such as from about $2 \times 10^{-6}/°$ C. to about $120 \times 10^{-6}/°$ C., from about $3 \times 10^{-6}/°$ C. to about $110 \times 10^{-6}/°$ C., from about $4 \times 10^{-6}/°$ C. to about $100 \times 10^{-6}/°$ C., from about $5 \times 10^{-6}/°$ C. to about $10 \times 10^{-6}/°$ C., from about $6 \times 10^{-6}/°$ C. to about $80 \times 10^{-6}/°$ C., from about $7 \times 10^{-6}/°$ C. to about $70 \times 10^{-6}/°$ C., from about $8 \times 10^{-6}/°$ C. to about $60 \times 10^{-6}/°$ C., from about $9 \times 10^{-6}/°$ C. to about $50 \times 10^{-6}/°$ C., from about $10 \times 10^{-6}/°$ C. to about $40 \times 10^{-6}/°$ C., or from about $20 \times 10^{-6}/°$ C. to about $30 \times 10^{-6}/°$ C., including all ranges and subranges therebetween.

As illustrated in FIG. 1, the laminate structure can further include an interlayer 113 attaching the first substrate 101 to the second substrate 107. The interlayer 113 can comprise a wide range of materials depending, e.g., on the application and the characteristics of the substrates. The interlayer can comprise various materials such as ethylene vinyl acetate (EVA), thermoplastic polyurethane (TPU), polyvinyl butyral (PVB), and ionomers, such as SentryGlas® ionomer from Kuraray Co., Ltd., or any other suitable interlayer material. In certain embodiments, the interlayer may be chosen from EVA and PVB.

According to non-limiting embodiments, the interlayer 113 can be selected from those having a Young's modulus greater than or equal to 15 MPa, such as greater than or equal to about 30 MPa, about 50 MPa, about 100 MPa, about 150 MPa, about 200 MPa, about 250 MPa, about 300 MPa, about 350 MPa, or about 400 MPa, including all ranges and subranges therebetween. PVB, for example, may have a Young's modulus greater than about 15 MPa, EVA can have a Young's modulus greater than about 50 MPa, and Sentry-Glas® ionomer can have a Young's modulus greater than about 275 MPa. In certain embodiments, the interlayer 113 may have a thickness T3 ranging from about 0.1 mm to about 2 mm, such as from about 0.3 mm to about 1.5 mm, from about 0.5 mm to about 1.2 mm, from about 0.75 to about 1.1 mm, or from about 0.9 to about 1 mm, including all ranges and subranges therebetween.

The interlayer 113 can be selected to improve the strength of the laminated structure and can further help retain pieces from the substrates, e.g., glass substrates, in the event that the laminate breaks or shatters. According to certain embodiments, an optically clear interlayer can be provided that is substantially transparent, although opaque and possibly colored interlayers may be provided in further examples. In other embodiments, desirable images can be printed, for example, by screen printing or digital scanning printing, onto the interlayer for aesthetic and/or functional purposes. Because these printed images can be arranged on the interface (e.g., on the interlayer and/or an interior surface of an optically clear substrate), they can be well preserved from scratch damages during the product lifetime.

According to various embodiments, when processed according to the methods disclosed herein, a laminate structure having little or no out-of-plane deflection (or bow) can be produced. Out-of-plane deflection can be measured as a distance between the lowest point on an edge of the laminate to the highest point in a central region of the laminate, or vice versa. In other words, out-of-plane deflection is the greatest distance between the lowest point (valley) in the laminate and the highest point (peak) in the laminate, e.g., the peak-to-valley bow (see, e.g., FIG. 4). In some embodiments, the out-of-plane deflection of the laminate structure can be less than about 3 times the overall thickness of the laminate, such as less than about 2.5 times, less than about 2 times, or less than about 1.5 times the overall thickness, including all ranges and subranges therebetween. According to additional embodiments, the out-of-plane deflection of the laminate structure can be less than or equal to the overall thickness of the laminate structure, such as less than about half (0.5) the overall thickness, less than about a quarter (0.25) of the overall thickness, or less than about one tenth (0.1) of the overall thickness, including all ranges and subranges therebetween. By way of non-limiting example, the out-of plane deflection can be less than about 20 mm, such as less than about 15 mm, less than about 12 mm, less than about 10 mm, less than about 8 mm, less than about 5 mm, less than about 3 mm, less than about 2 mm, less than about 1 mm, or less than about 0.5 mm, including all ranges and subranges therebetween.

In certain non-limiting embodiments, the laminate structure can comprise first and second glass substrates and an interlayer disposed between the substrates, wherein a minimum radius of curvature of the laminate structure at a temperature ranging from about −20° C. to about 90° C. is at least about 40 times greater than a maximum dimension of the laminate structure, and wherein a CTE of the second glass substrate is at least about 30% greater than a CTE of the first glass substrate. For example, the CTE mismatch between the first and second glass substrates can be greater than about 40%, 50%, 60%, 70%, 80%, 90%, 100%, 200%, 300%, or 500%, including all ranges and subranges therebetween. In other embodiments, the difference in CTE between the first and second glass substrates ($CTE_2$-$CTE_1$, or $CTE_1$-$CTE_2$) can range from about $1\times10^{-6}$/° C. to about $10\times10^{-6}$/° C., such as from about $2\times10^{-6}$/° C. to about $9\times10^{-6}$/° C., from about $3\times10^{-6}$/° C. to about $8\times10^{-6}$/° C., from about $4\times10^{-6}$/° C. to about $7\times10^{-6}$/° C., or from about $5\times10^{-6}$/° C. to about $6\times10^{-6}$/° C., including all ranges and subranges therebetween.

The laminate structure can furthermore include a maximum dimension, e.g., length, width, diameter, etc., which is used herein to refer to the dimension of the substrate having the largest magnitude, e.g., as compared to other dimensions. For instance, for a rectangular sheet comprising two short sides and two long sides, the maximum dimension can correspond to a length of the long side. Non-rectangular, e.g., four-sided, glass sheets can similarly comprise a maximum dimension corresponding to the length of the longest side. Maximum dimension can likewise be determined for substrates having more or less than four sides, such as polygons, triangles, and circles, to name a few.

Radius of curvature is the inverse of curvature. Flatter substrates are defined by a higher radius of curvature and a completely flat substrate has an infinite radius of curvature. In certain embodiments, the radius of curvature of the laminate structure can be greater than the maximum dimension of the laminate structure. For example, the radius of curvature can be twice the maximum dimension, about 5 times, about 10 times, about 15 times, about 20 times, about 30 times, or about 35 times the maximum dimension of the laminate structure. According to various embodiments, the minimum radius of curvature of the laminate structure can be at least about 40 times, at least about 50 times, at least about 60 times, at least about 70 times, at least about 80 times, at least about 90 times, or at least about 100 times greater than the maximum dimension of the laminate structure, including all ranges and subranges therebetween. In further embodiments, the radius of curvature can be measured at a temperature ranging from about 0° C. to about 75° C., such as from about 10° C. to about 50° C., from about 20° C. to about 40° C., or from about 25° C. to about 35° C., including all ranges and subranges therebetween.

In various embodiments, the laminate structure can have an overall thickness ranging from about 0.2 mm to about 10 mm, such as from about 0.5 mm to about 8 mm, from about 1 mm to about 6 mm, from about 2 mm to about 5 mm, or from about 3 mm to about 4 mm, including all ranges and subranges therebetween. Exemplary laminate structures may have at least one other dimension (e.g., length, width, diameter) ranging from about 100 mm to about 1000 mm or greater, such as from about 200 mm to about 900 mm, from about 300 mm to about 800 mm, from about 400 mm to about 700 mm, or from about 500 mm to about 600 mm, including all ranges and subranges therebetween. These dimensions are, of course, exemplary only and other dimensions of the laminate thickness, length, width, diameter, etc. can be used depending on the particular application.

The laminate structure may, in various embodiments, comprise a thin glass sheet and a thicker glass sheet. For instance, the first glass substrate may have a thickness ranging from about 0.3 mm to about 2 mm and the second glass substrate may have a thickness ranging from about 3 mm to about 10 mm, or vice versa. The CTE of the first glass substrate can range, for example, from about $3\times10^{-6}$/° to about $4\times10^{-6}$/° C., and the CTE of the second glass substrate can range from about $8\times10^{-6}$/° C. to about $10\times10^{-6}$/° C., or vice versa.

It is to be understood that the laminate structures in accordance with the disclosure are not limited to structures comprising two substrates and/or a single interlayer. For example, the laminate structure can also include additional substrates and/or interlayers, such as a second interlayer attaching a third substrate to the laminate. In certain embodiments, the laminate structure can include two glass substrates laminated to opposing surfaces of a plastic substrate. According to further aspects of the disclosure, the laminate structures can comprise one or more additional substrates or layers, such as a polymer film, an additional glass layer, a reflective layer, a photochromic layer, an electrochromic layer, an electrolytic layer, a photovoltaic layer, a sensor, indicator, or active device. For example, an electrochromic layer may include one or more electrically active thin films deposited on one or more surfaces of the substrates. Suitable electrochromic layers can include, but are not limited to, inorganic layers comprising tungsten trioxide $WO_3$. Of course, other combinations of layers and their respective features can be used to provide a wide array of configurations which are intended to fall within the scope of the disclosure.

Methods

Methods for making laminate structures and reducing bow in laminate structures are also disclosed herein. According to various embodiments, the methods disclosed herein can include a step of attaching the first substrate to the second substrate with an interlayer to produce, e.g., the three-layer laminate structure illustrated in FIG. 1. The stack thus produced can then be heated to a lamination temperature using any suitable method or apparatus known in the art. By way of a non-limiting example, the stack can be placed in a vacuum chamber, such as in a vacuum or lamination bag. The stack may be wrapped or otherwise secured to prevent shifting of the stack. For example, the stack may be secured using high-temperature tape, such as polyester tape. A thin breather cloth can be wrapped around the stack according to various embodiments.

The stack(s) may be processed one at a time, in a single layer within the chamber, or in multiple layers of stacks, depending on the desired throughput. The lamination bag can be heat sealed and a vacuum port can be attached thereto. The vacuum chamber can be at least partially evacuated and the stack(s) can be heated using a predetermined temperature and pressure profile. In some instances, the stack(s) can be placed between two plates which can be used to apply pressure to the stack and/or heat and/or cool the respective layers of the stack. For example, the lamination step may be carried out with specific temperature and pressure profiles used to achieve desired adhesion (bonding) quality of the laminated structure. Of course other apparatuses and methods for achieving the lamination temperature and/or pressure can be used and are envisioned as falling within the scope of the disclosure.

The average lamination temperature can range, in some embodiments, from about 120° C. to about 160° C., such as from about 125° C. to about 150° C., from about 130° C. to about 145° C., or from about 135° C. to about 140° C., including all ranges and subranges therebetween. For example, the lamination step can comprise ramping to the lamination temperature at a ramp rate ranging from about 1° C./min to about 10° C./min, such as from about 2° C./min to about 9° C./min, from about 3° C./min to about 8° C./min, from about 4° C./min to about 7° C./min, or from about 5° C./min to about 6° C./min. According to additional embodiments, the lamination pressure can range from about 0.1 MPa to about 1.5 MPa, such as from about 0.2 MPa to about 1.4 MPa, from about 0.3 MPa to about 1.3 MPa, from about 0.4 MPa to about 1.2 MPa, from about 0.5 MPa to about 1.1 MPa, from about 0.6 MPa to about 1 MPa, or from about 0.8 MPa to about 0.9 MPa, including all ranges and subranges therebetween. Pressure, if applied, may be applied gradually during temperature ramping or upon reaching the lamination temperature. Pressure may be gradually applied, e.g., at a ramp rate ranging from about 20 Pa/min to about 100 Pa/min, such as from about 30 Pa/min to about 80 Pa/min, from about 40 Pa/min to about 70 Pa/min, or from about 50 Pa/min to about 60 Pa/min, including all ranges and subranges therebetween. The laminate structure may be held at the lamination temperature and pressure for a residence time ranging from about 10 minutes to about 120 minutes, such as from about 20 minutes to about 100 minutes, from about 30 minutes to about 80 minutes, or from about 40 minutes to about 60 minutes, including all ranges and subranges therebetween.

After the desired residence time, the temperature can be ramped down, e.g., to room temperature at a rate ranging from about 1° C./min to about 10° C./min, such as from about 2° C./min to about 9° C./min, from about 3° C./min to about 8° C./min, from about 4° C./min to about 7° C./min, or from about 5° C./min to about 6° C./min, including all ranges and subranges therebetween. According to various embodiments, the temperature can be ramped down while maintaining the lamination pressure which can, in certain embodiments, reduce the formation of bubbles in the interlayer. Alternatively, the pressure can be reduced before or during temperature ramping. A gradual pressure reduction can be used, in some embodiments, for instance, at a ramp rate ranging from about 20 Pa/min to about 100 Pa/min, such as from about 30 Pa/min to about 80 Pa/min, from about 40 Pa/min to about 70 Pa/min, or from about 50 Pa/min to about 60 Pa/min, including all ranges and subranges therebetween.

According to further embodiments, the interlayer may be conditioned prior to lamination, for example, to control the moisture content of the interlayer, to soften the interlayer, and/or to remove any residual air between the interlayer and the substrates. In one example, the step of conditioning can adjust the moisture content of the interlayer to less than about 1%, such as less than or equal to about 0.8%, such as less than or equal to about 0.5%, less than or equal to about 0.3%, or less than or equal to about 0.2%, including all ranges and subranges therebetween. Controlling the moisture content of the interlayer may be beneficial to improve bonding quality of the interlayer during the lamination procedure. According to various embodiments, a conditioning step may be used to soften a PVB interlayer prior to lamination.

Conditioning can be carried out according to any method known in the art. For example, the interlayer may be placed in a controlled environment where the temperature and/or humidity can be adjusted to achieve the desired moisture content of the interlayer. Conditioning can take place before the interlayer is positioned between the two substrates and/or after the stack is formed. For instance, prior to lamination, the stack may be pre-heated to a conditioning temperature ranging from about 75° C. to about 100° C., such as from about 80° C. to about 95° C., or from about 85° C. to about 90° C., including all ranges and subranges therebetween.

Before and/or after lamination, the methods disclosed herein can further include optional processing steps that may provide additional beneficial features to the laminate structure. For instance, additional processing steps for exemplary glass substrates can include chemical strengthening (e.g., ion exchange), thermal tempering, acid etching, anti-glare processing, mechanical roughening, sol-gel processing, film deposition, anti-microbial coating, and the like.

According to various embodiments, at least one of the substrates may be an asymmetrically annealed or tempered glass substrate. For example, one or more glass substrates in a laminate structure can be chemically tempered, thermally tempered, and/or annealed to provide added durability and/or safety. Chemical tempering can include, for example, ion exchange processes in which metal ions within the glass substrate at or near the surface can be exchanged for larger metal ions. Incorporation of the larger ions into the glass can create a compressive stress in a near surface region and induce a corresponding tensile stress within a central region of the glass sheet to balance the compressive stress. Thus, the degree of surface compression may be related to the degree of ion exchange for chemical tempering. Thermal tempering can be achieved by heating the glass above its transition temperature ($T_g$) and rapidly quenching the glass surfaces, e.g., by forced air convection. Annealing can be carried out by heating the glass to an annealing temperature (or stress-relief point) and slowly cooling the glass to below its strain point. For both thermal tempering and annealing, the degree of surface compression may be related to the rate of cooling.

Figure 2:
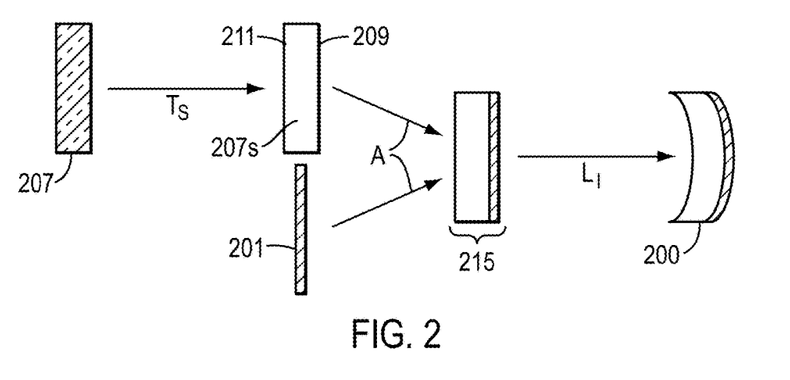
FIG. 2 illustrates an exemplary method for producing an asymmetric laminate structure.

Such tempering and annealing processes are often carried out symmetrically, such that both major surfaces of the glass sheet are evenly ion exchanged and/or heated or cooled at equal temperatures and/or rates. A method for manufacturing a laminate structure using a symmetrically tempered glass substrate is shown in FIG. 2. The second substrate 207 can be tempered (or annealed) by a symmetric process $T_S$ to create symmetric substrate 207s. This symmetric substrate can then be arranged in step A with a first substrate 201 and an interlayer (not shown) to produce stack 215. A symmetric or isothermal lamination process $L_I$ can then be used to produce laminate 200. Noticeably, when the CTE of the second substrate 207 is different from the CTE of the first substrate 201 (as depicted), the resulting laminate 200 can become undesirably bowed while the laminate structure cools due to the CTE mismatch.

Figure 3A:
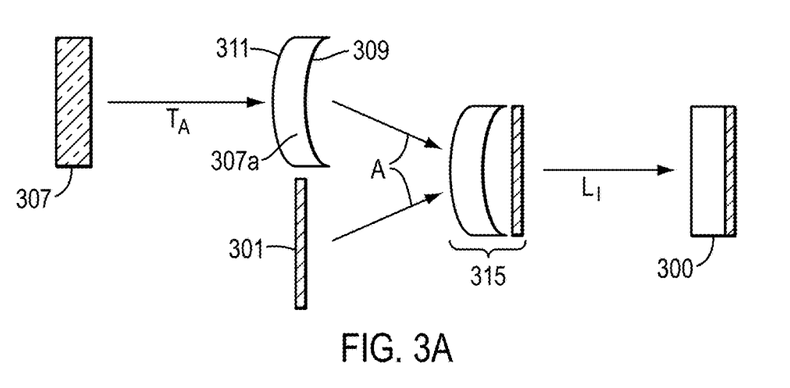
FIGS. 3A-B illustrate methods for producing an asymmetric laminate structure according to embodiments of the disclosure.
Figure 3B:
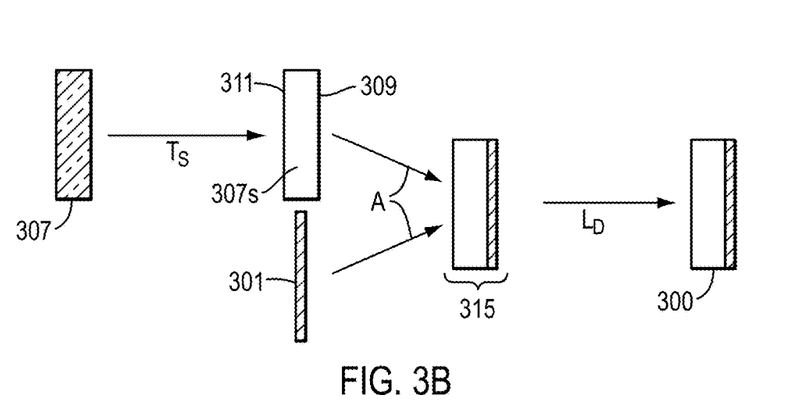

However, by replacing on or more of the symmetric tempering and/or lamination steps ($T_S$ or $L_I$) with an asymmetric process ($T_A$ or $L_D$) as shown in FIGS. 3A-B, it may be possible to reduce or eliminate the out-of-plane deflection in the resulting laminate. For example, in some embodiments, it may be desirable to thermally temper or anneal one or both of the substrates, such that one surface has a higher CS than the other. Due to the imbalanced internal stresses, the resulting asymmetric substrate may be bowed. As shown in FIG. 3A, the second substrate 307 can be tempered (or annealed) by an asymmetric process $T_A$ to create asymmetric substrate 307a with first surface 309 and second surface 311 having different CS. The asymmetric substrate can then be arranged in step A with a first substrate 301 and an interlayer (not shown) to produce stack 315. An isothermal (symmetric) lamination process $L_I$ can then be used to produce laminate 300. Alternatively, a differential (asymmetric) lamination process (not shown) can be used. Without wishing to be bound by theory, it is believed that the bow in the asymmetric substrate 307a may counterbalance the bow that would otherwise occur when laminating flat, e.g., symmetrically tempered (or annealed) substrates (see, e.g., FIG. 2). In other words, the thermal stresses due to CTE mismatch may be balanced by the internal stresses in the asymmetric substrate, thus reducing or eliminating the out-of-plane bow of the resulting laminate.

Asymmetric chemical tempering can be carried out, for instance, by applying a coating to one surface to prevent ion exchange while leaving the opposite surface exposed and/or by applying an electrical field during the tempering step. Asymmetric thermal tempering and/or annealing can be carried out by cooling one surface of the substrate at a different rate (e.g., faster or slower) than the opposite surface. Using such asymmetric processes it may be possible to produce a glass substrate that is bowed out of plane, e.g., in a substantially spherical shape. By way of non-limiting example, the shape and/or magnitude of the bow of the asymmetric glass substrate may be comparable to the bow that would be present in a laminate produced by symmetrical processing (see, e.g., laminate 200 in FIG. 2).

The asymmetric substrate 307a can be oriented in stack 315 such that the bow in the substrate counterbalances the potential bow in the laminate. For example, as depicted in FIG. 3A, an asymmetric substrate 307a may have a first surface 309 with a CS less than a CS of the second surface 311. Alternatively, the asymmetric substrate 307a may have a first surface 309 with a CS greater than a CS of the second surface 311 (not depicted). According to various embodiments, the CS of the first and second surfaces may differ, e.g., may have values differing by at least about 1%, such as at least about 5%, at least about 10%, at least about 15%, at least about 20%, at least about 25%, at least about 30%, at least about 40%, at least about 50%, and higher, including all ranges and subranges therebetween. For instance, a difference between the CS of the first and second surfaces ($CS_1-CS_2$ or $CS_2-CS_1$) may be greater than about 1 MPa, such as greater than about 5 MPa, greater than about 10 MPa, greater than about 50 MPa, greater than about 100 MPa, greater than about 200 MPa, greater than about 300 MPa, greater than about 400 MPa, greater than about 500 MPa, or greater, including all ranges and subranges therebetween.

In some embodiments, the CTE of the second substrate 307 may be greater than that of the first substrate 301 and the first surface 309 (lower CS) of the asymmetric substrate may be oriented towards the first substrate 301 in the stack 315, e.g., the first surface may be in contact with the interlayer. In other embodiments (not depicted), the CTE of the second substrate 307 may be less than that of the first substrate 301 and the second surface 311 (higher CS) of the asymmetric substrate may be oriented towards the first substrate 301 in the stack 315, e.g., the second surface may be in contact with the interlayer. According to additional embodiments, both the first and second substrates may be asymmetrically tempered or annealed. Of course, any other arrangements and/or orientations of the substrates are possible and envisioned as falling within the scope of the disclosure.

As shown in FIG. 3B, the second substrate 307 can be tempered (or annealed) by a symmetric process $T_S$ to create symmetric substrate 307s with first surface 309 and second surface 311 having substantially the same CS. Alternatively, an asymmetric tempering process (not shown) can be used. The symmetric substrate 307s can then be arranged in step A with a first substrate 301 and an interlayer (not shown) to produce stack 315. A differential (asymmetric) lamination process $L_D$ can then be used to produce laminate 300. Without wishing to be bound by theory, it is believed that the thermal stresses due to CTE mismatch may be reduced by asymmetrically or differentially heating and/or cooling the substrates during lamination, thus reducing or eliminating the out-of-plane bow of the resulting laminate.

For example, for a laminate comprising a second substrate with a CTE higher than that of the first substrate, out-of-plane deflection of a laminate may be reduced by differentially heating the stack during lamination such that the first substrate is heated at a faster rate and/or by differentially cooling the laminate after lamination such that the first substrate is cooled at a slower rate than the second substrate. Similarly, for a laminate comprising a first substrate with a CTE higher than that of the second substrate, the stack may be differentially heated during lamination such that the first substrate is heated at a slower rate and/or the laminate may be differentially cooled after lamination such that the first substrate is cooled at a faster rate than the second substrate. For instance, the heating and/or cooling rate of the first and second surfaces may differ, e.g., may have values differing by at least about 1%, such as at least about 5%, at least about 10%, at least about 15%, at least about 20%, at least about 25%, at least about 30%, at least about 40%, at least about 50%, and higher, including all ranges and subranges therebetween. In some embodiments, a difference between the heating and/or cooling rate of the first and second surfaces may be greater than about 1° C./min, such as greater than about 2° C./min, greater than about 3° C./min, greater than about 4° C./min, greater than about 5° C./min, greater than about 6° C./min, greater than about 7° C./min, greater than about 8° C./min, greater than about 9° C./min, greater than about 10° C./min, or greater, including all ranges and subranges therebetween.

In the case of differential heating, the lamination can take place at an average lamination temperature as described above. The average lamination temperature can thus range, in some embodiments, from about 120° C. to about 160° C., such as from about 125° C. to about 150° C., from about 130° C. to about 145° C., or from about 135° C. to about 140° C., including all ranges and subranges therebetween. According to various embodiments, a differential heating profile can include holding one substrate at a higher (or lower) lamination temperature. For example, the first substrate may be held at a first lamination temperature that is at least 20° C. greater than a second lamination temperature at which the second substrate is held, or vice versa. Suitable hold (or residence) times are described above. In some embodiments a differential between the first and second lamination temperatures ($T_{L1}-T_{L2}$ or $T_{L2}-T_{L1}$) can range from about 20° C. to about 50° C., from about 25° C. to about 40° C., or from about 30° C. to about 35° C., including all ranges and subranges therebetween.

It is to be understood that the various asymmetric processing methods disclosed herein can be combined with one another in any desired arrangement to produce a substantially flat laminate having the desired degree of out-of-plane deflection. In some embodiments, the first and second substrates may both be asymmetrically tempered or annealed and the resulting stack may be isothermally heated during lamination and/or isothermally cooled after lamination. In other embodiments, the second substrate may be asymmetrically tempered or annealed and the resulting stack may be differentially heated during lamination and/or differentially cooled after lamination. In further embodiments, the first substrate may be asymmetrically tempered or annealed and the resulting stack may be differentially heated during lamination and/or differentially cooled after lamination. Accordingly, the methods disclosed herein can comprise one or more asymmetric processing steps which can, in some embodiments, counterbalance the bow that might otherwise result from laminating symmetric substrates using symmetric processing steps.

The methods disclosed herein can be used to produce asymmetric laminate structures with one or more advantages as compared to conventional lamination methods. For example, the ability to reduce the impact of CTE mismatch on laminate deflection (or bow) may allow for a wider choice of substrate materials, interlayers, and/or laminate geometries. Further, the instant methods may provide a wider selection of deflection-free laminates, such as larger laminate structures and/or laminate structures comprising unconventional combinations of substrates. Because laminate structures manufactured according to the instant methods may have little or no deflection, e.g., bow, the optical performance of such laminates may also be improved. Finally the methods disclosed herein may be less complex than other methods for manufacturing asymmetric laminates, such as laminating under pressure and/or using asymmetric heating. Of course, it is to be understood that the laminate structures and methods disclosed herein may not have one or more of the above advantages, but are intended to fall within the scope of the appended claims.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a glass substrate" includes examples having two or more such glass substrates unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a structure that comprises A+B+C include embodiments where a structure consists of A+B+C and embodiments where a structure consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

Comparative Example 1

An asymmetric laminate structure having dimensions 66 cm×76.2 cm (26"×30") was prepared using 0.7 mm thick Corning® EAGLE XG® glass, 6 mm thick soda lime glass (SLG), and a 0.76 mm thick EVA interlayer. The Corning EAGLE XG® substrate had a CTE of approximately $3.2 \times 10^{-6}/°$ C., while soda lime glass has a CTE of approximately $8.5\text{-}9.5 \times 10^{-6}/°$ C. The three layers were placed in contact with each other at room temperature and, heated to a lamination temperature of 140-150° C. at a pressure of about 1 MPa (140 psi), and subsequently cooled back down to room temperature.

Figure 4:
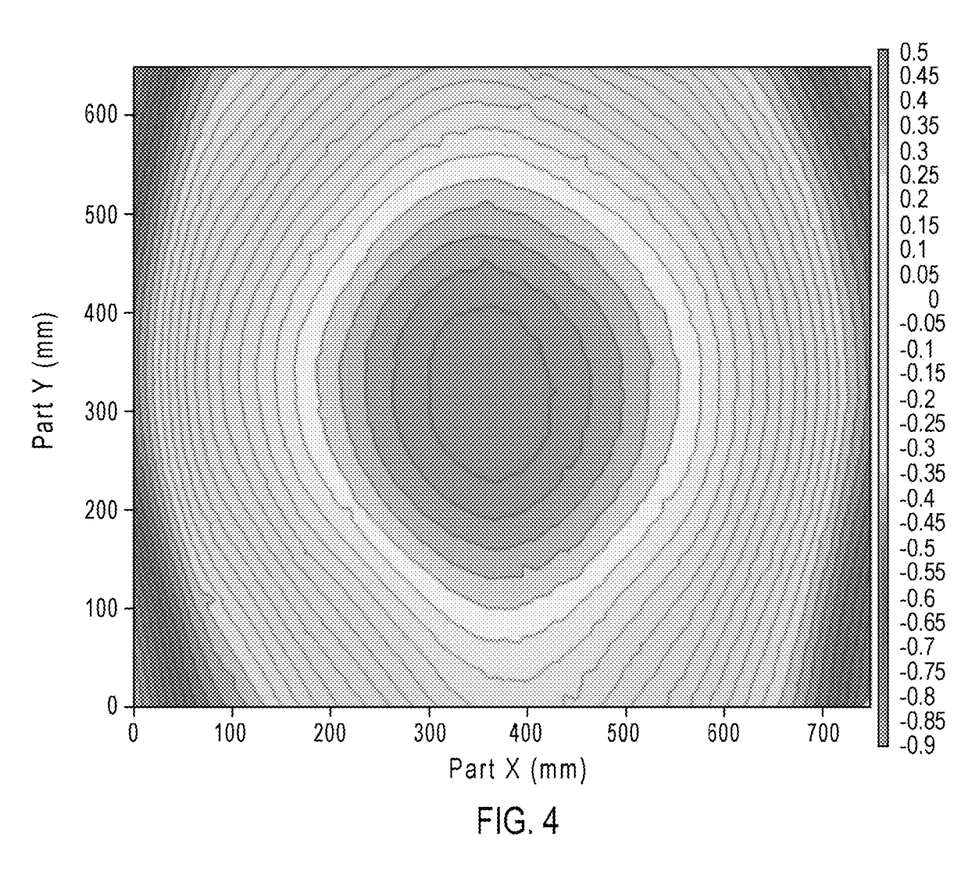
FIG. 4 illustrates the out-of-plane deflection for a laminate structure produced using prior art lamination methods.

The glass substrates naturally contracted when cooled down from the lamination temperature to room temperature. Due to the differing CTEs, the two substrates contracted to varying degrees, resulting in uniform biaxial stress and thus spherical out-of-plane bow, which is depicted in FIG. 4. The out-of-plane bow (center-to-corner or peak-to-valley) for this part was 1.4 mm (0.5 mm–(–0.9 mm)).

Example 2

Three asymmetric laminate structures having dimensions 91.44 cm×152.4 cm (3'×5') were prepared using 0.7 mm thick Corning® EAGLE XG® glass, 6 mm thick soda lime glass, and a 0.76 mm PVB interlayer. The rate of heating or cooling of both glass substrates was varied by using insulating blankets during lamination. In Example 2A, the soda lime glass was cooled faster than the EAGLE XG® glass; in Example 2B, the soda lime glass was heated faster than the EAGLE XG® glass; and in Example 2C, the soda lime glass was cooled slower than the EAGLE XG® glass. The resulting out-of-plane bow (mm) for each laminate is shown in Table I below.

TABLE I

Out-of-Plane Bow for Laminate Structures

| Example | Differential Temperature Profile | Isothermal | With Differential Temperature |
|---|---|---|---|
| 2A | SLG cooled faster | 7.1 | 5.9 |
| 2B | SLG heated faster | 5.75 | 6.4 |
| 2C | SLG cooled slower | 7.1 | 13.6 |

As demonstrated in Table I, by heating the substrate with greater CTE (soda lime) slower and/or cooling it faster than the substrate with lower CTE (EAGLE XG®), the difference in absolute expansion of the two substrates can be reduced, thus reducing the induced stress in the laminate and the resulting out-of-plane bow. For instance, in Example 2A, when the soda lime glass was cooled faster than the EAGLE XG® glass, an improvement of 17% less bow (as compared to isothermal processing) was observed. Conversely, when the substrate with greater CTE (soda lime) was heated faster and/or cooled slower than the substrate with lower CTE (EAGLE XG®), the out-of-plane bow of the resulting laminate was worse than that of the isothermally processed laminate (Examples 2B-C).

What is claimed is:

1. A laminate structure comprising a first substrate, a second substrate, and an interlayer attaching the first and second substrates,
   wherein the second substrate is a glass substrate comprising a first surface and a second surface, the first surface having a compressive stress less than a compressive stress of the second surface;
   wherein the interlayer is positioned in direct contact with the second surface of the second substrate;
   wherein a coefficient of thermal expansion of the first substrate is different than a coefficient of thermal expansion of the second substrate; and
   wherein a minimum radius of curvature of the laminate structure at a temperature ranging from about −20° C. to about 90° C. is at least about 40 times greater than a maximum dimension of the laminate structure.

2. The laminate structure of claim 1, wherein the first substrate has a thickness ranging from about 0.3 mm to about 2 mm, and wherein the second substrate has a thickness ranging from about 3 mm to about 10 mm.

3. The laminate structure of claim 1, wherein a difference between the coefficient of thermal expansion of the first substrate and the coefficient of thermal expansion of the second substrate ranges from about $1 \times 10^{-6}/°$ C. to about $10 \times 10^{-6}/°$ C.

4. The laminate structure of claim 1, wherein the stack further comprises at least one additional layer chosen from polymer layers, additional glass layers, reflective layers, conductive layers, electrochromic layers, photochromic layers, and photovoltaic layers.

5. The laminate structure of claim 4, wherein an out-of-plane deflection of the laminate structure is less than twice a thickness of the laminate structure.

6. The laminate structure of claim 1, wherein a coefficient of thermal expansion of the second substrate is less than a coefficient of thermal expansion of the first substrate.

7. A method for making a laminate structure, comprising:
   positioning an interlayer between a first substrate and a second substrate to form a stack; and
   heating the stack to a lamination temperature to form a laminate structure;
   wherein the second substrate is a glass substrate comprising a first surface and a second surface, the first surface having a first compressive stress less than a second compressive stress of the second surface;
   wherein the interlayer is positioned in direct contact with the second surface of the second substrate;
   wherein a coefficient of thermal expansion of the first substrate is different than a coefficient of thermal expansion of the second substrate; and
   wherein a minimum radius of curvature of the laminate structure at a temperature ranging from about −20° C. to about 90° C. is at least about 40 times greater than a maximum dimension of the laminate structure.

8. The method of claim 7, wherein the coefficient of thermal expansion of the second substrate is at least 30% greater than the coefficient of thermal expansion of the first substrate.

9. The method of claim 7, wherein the laminate structure further comprises at least one additional layer chosen from polymer layers, additional glass layers, reflective layers, conductive layers, electrochromic layers, photochromic layers, and photovoltaic layers.

10. The method of claim 7, wherein a coefficient of thermal expansion of the second substrate is less than a coefficient of thermal expansion of the first substrate.

11. The method of claim 7, wherein the second substrate is a thermally tempered or chemically tempered glass sheet.

12. The method of claim 7, wherein the first substrate is chosen from glass, glass-ceramics, ceramics, polymers, and metal substrates.

13. The method of claim 7, wherein an out-of-plane deflection of the laminate structure is less than twice a thickness of the laminate structure.

* * * * *